United States Patent [19]

Kyogoku

[11] Patent Number: 4,659,178

[45] Date of Patent: Apr. 21, 1987

[54] OPTICAL FILTER

[75] Inventor: Tetsuo Kyogoku, Toyokawa, Japan

[73] Assignee: Minolta Camera Kabushiki Kaisha, Osaka, Japan

[21] Appl. No.: 729,539

[22] Filed: May 2, 1985

[30] Foreign Application Priority Data

May 2, 1984 [JP] Japan .................... 59-89043

[51] Int. Cl.⁴ .......................... G02B 5/28; G02B 5/22
[52] U.S. Cl. ..................... 350/166; 350/316
[58] Field of Search ................. 350/166, 316

[56] References Cited

U.S. PATENT DOCUMENTS 2,871,371 1/1959 Gray .................... 350/166
3,504,959 4/1970 Hennessey .................... 350/316

Primary Examiner—Bruce Y. Arnold
Attorney, Agent, or Firm—Price, Gess & Ubell

[57] ABSTRACT

An optical filter comprising a colored glass plate having band-pass filter characteristics and an interference multilayer film formed over the glass plate. The colored glass plate defines a transmission band of relatively narrow width in the visible range. The interference multilayer film comprises at least two unit layers and a low refractive index material layer interposed therebetween and having an optical thickness of $\lambda_o/4$. The unit layer is composed of two high refractive index material layers having an optical thickness of $\lambda_o/4$ and a low refractive index material layer interposed therebetween and having an optical thickness of $\lambda_o/2$. The interference multilayer film is designed to define a reflection band for removing a predetermined range of wavelengths from the transmission band of the color glass plate.

10 Claims, 8 Drawing Figures

OPTICAL FILTER

BACKGROUND OF THE INVENTION

The present invention relates generally to optical filters for use in microfilm-reader or the like with high-magnification lenses for correcting chromatic aberration, and more particularly to an optical filter which comprises a plate of colored glass having band-pass filter characteristics and an interference multilayer film formed over the glass plate.

Conventionally, silver interference filters are known for correcting the chromatic aberration of the high-magnification lenses. However, the silver interference filters have the drawback of being deficient in the amount of transmitted light. Further, it is known as another method for correcting chromatic aberration to construct a lens system by combining lenses having different dispersions from each other. However, this method requires many lenses and therefore has the drawback of being expensive.

To overcome these drawbacks, band-pass filters are presently commercially available which comprise the combination of two colored glass plates as shown in FIG. 7. The band-pass filter is composed of a first colored glass plate 01 (Y50, product number, manufactured by Hoya Corporation) provided with a first multilayer film 02 in the form of a thin optical and a second colored glass plate 03 (HA30, product number, manufactured by Hoya Corporation) provided with a second multilayer film 04 in the form of a thin optical film, the glass plates 01 and 03 being cemented together, so that the filter passes only the light of wavelengths of 500 to 600 nm as seen in FIG. 8. The two colored glass plates 01 and 03 are each about 2.5 mm in thickness, while the multilayer films 02 and 04 formed over these glass plates include about 30 layers in total. Accordingly, the filter has the drawback of having a large thickness (about 5 mm) and necessitating a large space for installation. Further as will be apparent from FIG. 7, the filter has another drawback in that it has a transmittance as low as up to about 60% and passes only a small amount of light. Moreover, the filter is made up of a large number of components and is not as low as is expected in cost. Thus, the filter still remains to be improved.

SUMMARY OF THE INVENTION

Accordingly, the main object of the present invention is to provide an improved optical filter which has a reduced thickness, transmits an increased amount of light and is nevertheless inexpensive.

The above and other objects of the present invention can be accomplished by an optical filter which comprises a plate of colored glass having band-pass filter characteristics and an interference multilayer film formed over the colored glass plate. The colored glass plate transmits therethrough light of a predetermined range of wavelengths. The interference multilayer film is composed of high refractive index material layers having a predetermined optical thickness and low refractive index material layers having a predetermined optical thickness which are arranged alternately to remove from the light passing through the colored glass plate a fraction having a predetermined range of wavelengths. The optical filter is therefore adpated to eventually pass only light of the desired range of wavelengths.

According to a preferred embodiment of the present invention, a low refractive index material layer having an optical thickness of $\lambda_0/2$ is sandwiched between high refractive index material layers having an optical thickness of $\lambda_0/4$ to form one unit layer. At least two such unit layers and a low refractive index material layer having an optical thickness of $\lambda_0/4$ and interposed therebetween are combined into an interference multilayer film as formed over a colored glass plate having bypass filter characteristics. The symbol $\lambda_0$ represents a wavelength which determines the reflectance characteristics of the interference multilayer film on the colored glass plate.

The structure of the present optical filter described above reduces the number of colored glass plates and the number of constituent layers of the multilayer film conventionally required. This advantageously realizes a compact inexpensive optical filter which transmits an increased amount of light.

BRIEF DESCRIPTION OF THE DRAWINGS

The above and other objects and features of the present invention will become apparent from the following description taken in conjunction with the preferred embodiments thereof with reference to the accompanying drawings.

DETAILED DESCRIPTION OF THE INVENTION

Referring now in detail to the drawings, a low refractive index layer nL having an optical thickness of $\lambda_0/2$ is sandwiched between two high refractive index layers nH, nH each having an optical thickness of $\lambda_0/4$ to form one unit u. An interference multilayer film comprising two such units u and a low refractive index layer NL interposed therebetween and having an optical thickness of $\zeta_0/4$ is formed over a colored glass plate 1 by a suitable method, such as vacuum evaporation, whereby an optical filter is fabricated.

(Note: The symbol $\lambda_0$ represents a wavelength selected from the band of wavelenghs to be passed through the multilayer film, more particularly a dominant wavelength positioned approximately in the middle of the band.)

Figure 1:
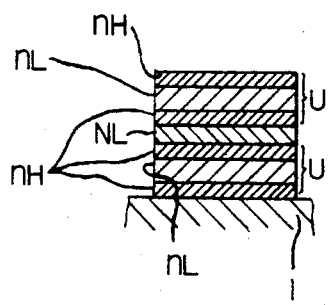
FIG. 1 is a schematic side sectional view showing an example of multilayer film for use in the optical filter of the present invention.
Figure 2:
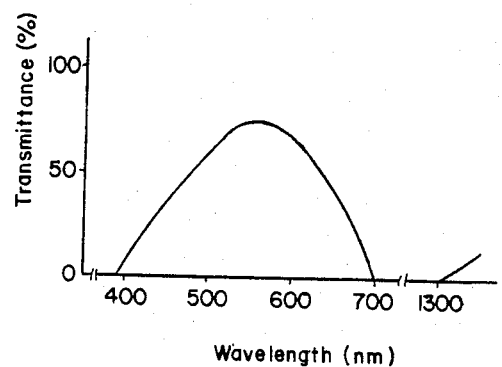
FIG. 2 is a graph showing the relation between the spectral transmittance of a colored glass plate and the wavelength of light transmitted therethrough.

The colored glass plate 1 has band-pass filter characteristics like a plate of phosphate glass containing copper ion. An example of such glass is cyan glass (IEC701, product number, manufactured by Isuzu Glass Co., Ltd.). More specifically, the colored glass plate 1 has characteristics of not passing light not smaller than 700 nm and not larger than 400 nm in wavelength but satisfactorily passing light having wavelengths of 500 to 600 nm as shown in FIG. 2.

Examples of useful high refractive index materials for forming the high refractive index layers nH are titanium oxide ($TiO_2$, refractive index $n=2.4$), cerium oxide ($CeO_2$, $n=2.3$), zirconium oxide ($ZrO_2$, $n=2.1$), a mixture ($n=2.2$) of titanium oxide ($TiO_2$) and zirconium oxide ($ZrO_2$), zinc sulfide (ZnS, $n=2.3$), etc.

Examples of low refractive index materials useful for forming the low refractive index layers nL, NL are magnesium fluoride ($MgF_2$, $n=1.38$), silicon dioxide ($SiO_2$, $n=1.46$), cryolite ($AlF_3 \cdot 3NaF$, $n=1.33$), lead fluoride ($PbF_2$, $n=1.75$), thorium fluoride ($ThF_4$, $n=1.52$), etc.

Figure 3:
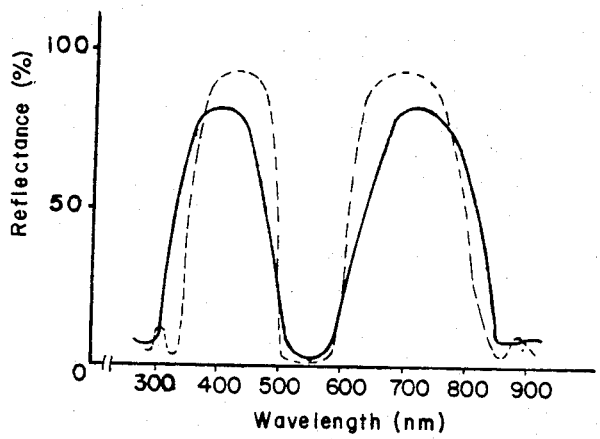
FIG. 3 is a graph showing the relation between the spectral reflectance of the multilayer film and the wavelength of light transmitted therethrough.

The seven-layer interference film, when set to $\lambda_0$ of 550 nm, has the spectral reflectance characteristics indicated in a solid line in FIG. 3 and removes light with wavelengths of less than 500 nm and light with wavelength of larger than 600 nm from the light passing through the colored glass plate 1. Consequently, the optical filter transmits light with wavelenghts of 500 to 600 nm and achieves transmittance of as high as about 80% as seen in FIG. 2.

Figure 4:
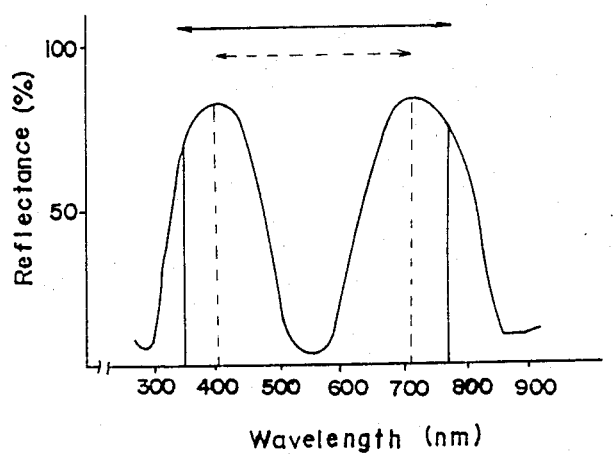
FIG. 4 is a diagram showing how to select the colored glass plate.

The colored glass plate to be combined with the interference multilayer film is determined by the following method. When an interference multilayer film is selected first with the reflectance characteristics indicated in a solid line in FIG. 3, a color glass plate is selected which has as its transmittance band the same wavelength band as that between the two reflectance peaks ($\lambda_{peak} \approx 400$, 700 nm) on opposite sides of the transmission band shown in FIG. 3, or a wavelength band of slightly larger width than this wavelength band. Preferably, the color glass plate to be selected is one having as its transmittance band the wavelength band (about 300 nm in bandwidth) between the two peaks, i.e. the broken-line range shown in FIG. 4. The color glass plate may be one having as its transmittance band the wavelength band (with a bandwidth of about 400 nm) between the two wavelengths ($\lambda L \approx 350$ nm, $\lambda H \mp 750$ nm) at which the reflectance starts to decrease outside the two peaks, i.e. the solid-line range shown in FIG. 4. Alternatively, when a colored glass plate is selected first, a suitable interference multilayer film is designed based on the same concept as above.

Figure 5:
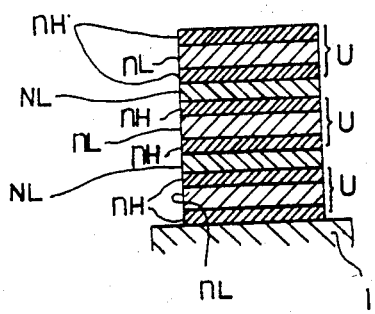
FIG. 5 is a schematic side sectional view showing another example of multilayer film.

FIG. 5 shows another embodiment, wherein three units u the same as the one already stated are superposed into an eleven-layer interference film as formed over a colored glass plate 1, with a low refractive index layer NL of an optical thickness of $\lambda_0/4$ interposed between each two adjacent units, whereby an optical filter is fabricated. The eleven-layer interference film, when set to $\lambda_0$ of 550 nm, has the spectral reflectance characteristics indicated in a broken line in FIG. 3 and effectively removes light with wavelengths of below 500 nm and light with wavelengths of over 600 nm from the light passing through the colored glass plate 1.

Figure 6:
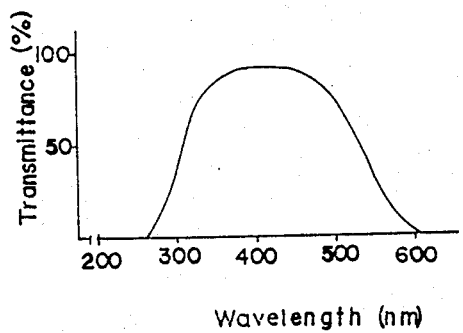
FIG. 6 is a graph showing the relation between the spectral transmittance of a "Blue Filter" and the wavelength of light transmitted therethrough.
Figure 7:
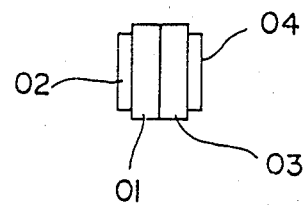
FIG. 7 is a schematic side view showing a prior-art optical filter.
Figure 8:
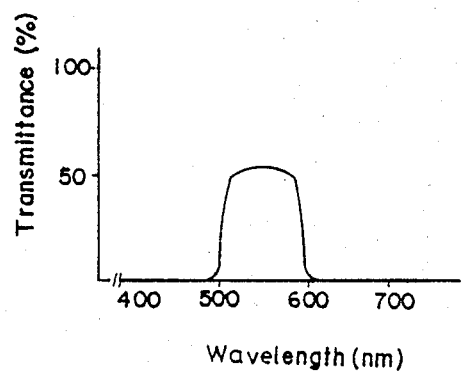
FIG. 8 is a graph showing the relation between the spectral transmittance of the optical filter of FIG. 7 and the wavelength of light transmitted therethrough.

The colored glass plate 1 can be any of those having band-pass filter characteristics, such as Blue Filter (B-410, product number, manufactured by Hoya Corporation) which is a colored glass filter containing various ions. This Blue Filter has high transmittance for light with wavelengths of 350 to 480 nm (especially of 380 to 460 nm) as shown in FIG. 6. It is advantageously usable for providing an optical filter for passing light with wavelengths of 350 to 450 nm or 370 to 470 nm when the interference multilayer film combined therewith is designed to have $\lambda_0$ of 400 nm or 420 nm.

While the optical filter of the present invention is usable with remarkable advantages for microfilm-reader which require varying high magnifications, it is useful also for electrophotographic copying machines, etc.

As described above, the present invention employs a rational structure comprising a colored glass plate having band-pass filter characteristics and an interference multilayer film formed over the glass plate and having a predetermined optical thickness. Accordingly, the optical filter of the invention requires use of only one colored glass plate, consists of a smaller number of components including a reduced number of superposed layers, has a reduced thickness (about 2 mm), can be installed in a smaller space and is available inexpensively. Moreover, the filter is about 80% in maximum transmittance, permitting transmission of an increased amount of light. Because of the increase in the amount of transmitted light, the optical filter of the present invention provides a sufficient amount of light and assures effective correction of chromatic aberration when used in combination with a halogen lamp, in place of the conventional combination of a silver interference filter and halogen lamp which was insufficient in the amount of light available.

Although the present invention has been fully described with reference to its preferred embodiments, it is to be understood that various changes and modifications may be made without departing from the spirit or scope of the following claims.

What is claimed is:

1. An optical filter comprising:
   a plate of colored glass having band-pass filter characteristics and defining a transmission band over a visible region of relatively narrow width, and
   an interference multilayer film formed over the colored glass plate and having a reflection band for removing a predetermined range of wavelengths from the transmission band so that the optical filter defines a specified transmission band,
   the interference multilayer film including at least two unit layers and a first intermediate low refractive index material layer interposed therebetween, each of the unit layers including two high refractive index material layers and a second intermediate low refractive index material layer interposed therebetween,
   wherein the second intermediate low refractive index material layer has an optical thickness of $\lambda_0/2$, and the first intermediate low refractive index material layer and the high refractive index material layers have an optical thickness of $\lambda_0/4$, where $\lambda_0$ is a dominant wavelength for the interference multilayer film.

2. An optical filter as defined in claim 1 wherein the interference multilayer film includes three unit layers and two first intermediate low refractive index material layers respectively interposed between two adjacent unit layers.

3. An optical filter as defined in claim 1 wherein the specified transmission band of the optical filter is 500 to 600 nm.

4. An optical filter as defined in claim 3 wherein the dominant wavelength is about 550 nm.

5. An optical filter as defined in claim 1 wherein the colored glass is phosphate glass containing copper ions.

6. An optical filter as defined in claim 5 wherein the colored glass is a cyan color.

7. An optical filter as defined in claim 1 wherein the high refractive index material is titanium oxide ($TiO_2$), cerium oxide ($CeO_2$), zirconium oxide ($ZrO_2$), a mixture of titanium oxide and zirconium oxide, or zinc sulfide (ZnS).

8. An optical filter as defined in claim 1 wherein the low refractive index material is magnesium fluoride ($MgF_2$), silicon dioxide ($SiO_2$), cryolite ($AlF_3.3NaF$), lead fluoride ($PbF_2$), or thorium fluoride ($ThF_4$).

9. An optical filter for correcting chromatic aberration comprising:

a plate of colored glass having band-pass filter characteristics and defining a transmission band over a visible region of relatively narrow width, and an interference multilayer film formed over the colored glass plate and defining a reflection band for removing a predetermined range of wavelengths from the transmission band to define a selected transmission wavelength region for the optical filter, the interference multilayer film comprising high refractive index material layers and low refractive index material layers arranged alternately, each of the materials layers having an optical thickness determined by the mid-wavelength $\lambda_0$ of the selected transmission wavelength region.

10. An optical filter as defined in claim 9 wherein the interference multilayer film comprises an even number of high refractive index material layers and an odd number of low refractive index material layers, and the uppermost layer and the lowermost layer of the film are high refractive index material layers.

* * * * *